US009656310B2

(12) United States Patent
Johnson

(10) Patent No.: US 9,656,310 B2
(45) Date of Patent: May 23, 2017

(54) PAINT DISPENSING METHOD AND APPARATUS

(71) Applicant: The Sherwin-Williams Company, Cleveland, OH (US)

(72) Inventor: James J. Johnson, Akron, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 14/675,096

(22) Filed: Mar. 31, 2015

(65) Prior Publication Data

US 2015/0273543 A1 Oct. 1, 2015

Related U.S. Application Data

(60) Provisional application No. 62/028,444, filed on Jul. 24, 2014, provisional application No. 61/973,639, filed on Apr. 1, 2014.

(51) Int. Cl.

| | |
|---|---|
| ***B05B 7/32*** | (2006.01) |
| ***B09B 3/00*** | (2006.01) |
| ***B65D 83/20*** | (2006.01) |
| ***B65D 83/38*** | (2006.01) |
| *B05C 17/005* | (2006.01) |
| *B65D 83/70* | (2006.01) |

(52) U.S. Cl.

CPC .......... *B09B 3/0058* (2013.01); *B65D 83/203* (2013.01); *B65D 83/207* (2013.01); *B65D 83/382* (2013.01); *B05C 17/00589* (2013.01); *B65D 83/70* (2013.01)

(58) Field of Classification Search

CPC ... A24F 14/002; B05B 7/2402; B65D 83/203; B65D 83/207; B65D 83/382; B65D 83/70; B09B 3/0058

USPC .......................................... 239/271, 272, 309

See application file for complete search history.

(56) References Cited

U.S. PATENT DOCUMENTS

| | | | | |
|---|---|---|---|---|
| 2,593,552 A * | 4/1952 | Folkman | .................. | A61L 9/14 215/383 |
| 2,887,272 A | 5/1959 | Rosenthal | | |
| 3,880,187 A | 4/1975 | Kneusel | | |

(Continued)

FOREIGN PATENT DOCUMENTS

| | | |
|---|---|---|
| WO | 2006018593 | 2/2006 |

OTHER PUBLICATIONS

International Search Report and Written Opinion, European Patent Office, Jun. 17, 2015, PCT/US2015/023682.

*Primary Examiner* — Davis Hwu

(74) *Attorney, Agent, or Firm* — Daniel A. Sherwin; Roger Emerson; Emerson Thomson and Bennett, LLC

(57) ABSTRACT

A fluid dispensing apparatus may be used to dispense a paint fluid from a paint container that is under pressure and that has a pierceable membrane. The fluid dispensing apparatus may include a valve body having a bore, an adaptor having a bore and a piercing member, and a nozzle having a bore. The fluid dispensing apparatus may be operable to pierce the pierceable membrane to communicate the paint within the paint container with the adaptor bore and with the valve body bore. The nozzle may be operable to permit the paint to flow under the pressure out of the paint container, through the adaptor bore, through the valve body bore and through the nozzle bore to ambient.

20 Claims, 19 Drawing Sheets

(56) References Cited

U.S. PATENT DOCUMENTS

| | | | | |
|---|---|---|---|---|
| 4,461,454 | A * | 7/1984 | Vadnais | B05C 17/002 222/521 |
| 4,881,662 | A * | 11/1989 | Tallman | B67B 7/26 222/543 |
| 6,068,202 | A * | 5/2000 | Hynes | B05B 7/02 118/241 |
| 6,095,433 | A * | 8/2000 | Langdon | A01G 27/006 222/553 |
| 6,378,789 | B1 * | 4/2002 | Seaman, Jr. | B05B 7/0408 137/889 |
| 6,817,553 | B2 * | 11/2004 | Steur | B05B 1/1627 239/223 |
| 2008/0169047 | A1 | 7/2008 | Connolly et al. | |
| 2011/0180626 | A1 | 7/2011 | Kang | |

* cited by examiner

PAINT DISPENSING METHOD AND APPARATUS

This application claims the benefit of provisional patent application No. 61/973,639 entitled "DISPENSING METHOD AND APPARATUS" filed Apr. 1, 2014 and also claims benefit of provisional patent application No. 62/028,444 entitled "METHOD AND APPARATUS FOR AEROSOL VALVE ASSEMBLY FOR MARKING PAINT" filed Jul. 24, 2014, both of which are incorporated herein by reference.

I. BACKGROUND

A. Field of Invention

This invention generally relates to methods and apparatuses for dispensing paint from pressurized paint containers.

B. Description of the Related Art

It is well known in the art to dispense paint from a pressurized can using a laterally displaced nozzle integrated into the top of the can. An example of such a known apparatus is aerosol paint can 200, shown in FIG. 2, having laterally displaceable nozzle 202. While such aerosol paint can products have enjoyed wide commercial success, a challenge presented by such aerosol paint cans is that of disposal. Because the can is pressurized, sometimes limitations are placed on how and where the used paint cans can be disposed. It can be difficult for the user to depressurize the paint can once all the paint has been sprayed. A second problem is once the user has sprayed all the dispensable paint, some amount of the paint remains in the can. Both of these conditions lead to problems when the user needs to dispose of the paint can. The paint can may explode if one tries to burn or crush it. The applied heat or the crushing action will increase the paint can's internal pressure and thus an explosion risk is presented. Also the paint remaining in a paint can may represent a hazardous chemical or fire hazard and thus another disposal problem.

The marketplace would prefer an apparatus and method for dispensing paint from pressurized containers that provides an economical, reliable, and easy method of depressurizing the containers.

II. SUMMARY

According to some embodiments of this invention, a fluid dispensing apparatus may be used in dispensing a paint fluid from an associated paint container under a pressure greater than ambient. The associated paint container may contain associated paint and may have a pierceable membrane. The fluid dispensing apparatus may comprise: a valve body having a top, a bottom and a bore that extends through the valve body; an adaptor having a top, a bottom, a bore that extends through the adaptor and a piercing member; and, a nozzle attached to the top of the valve body and having a bore that is communicatable with the valve body bore. The bottom of the valve body may be attached to the top of the adaptor and the adaptor bore may communicate with the valve body bore. The fluid dispensing apparatus may be operable by attaching the bottom of the adaptor to the associated paint container to pierce the pierceable membrane with the piercing member to communicate the associated paint within the paint container with the adaptor bore and thus with the valve body bore. The nozzle may be operable to permit the associated paint within the associated paint container to flow under the pressure out of the associated paint container, through the adaptor bore, through the valve body bore and through the nozzle bore to ambient.

According to other embodiments of this invention, a method of dispensing a paint fluid from an associated paint container under a pressure greater than ambient may be provided. The associated paint container may contain associated paint and may have a pierceable membrane. The method may comprise the steps of: (A) providing a fluid dispensing apparatus comprising: (1) a valve body having a top, a bottom and a bore that extends through the valve body; (2) an adaptor having a top attached to the bottom of the valve body, a bottom, a bore that extends through the adaptor and a piercing member; wherein the adaptor bore communicates with the valve body bore; and, (3) a nozzle attached to the top of the valve body and having a bore that is communicatable with the valve body bore; (B) attaching the bottom of the adaptor to the associated paint container to pierce the pierceable membrane with the piercing member to communicate the associated paint within the paint container with the adaptor bore and thus with the valve body bore; and, (C) operating the nozzle to permit the associated paint within the associated paint container to flow under the pressure out of the associated paint container, through the adaptor bore, through the valve body bore and through the nozzle bore to ambient.

According to still other embodiments of this invention, a paint apparatus may comprise: (A) a paint container containing a paint fluid under a pressure greater than ambient and having a pierceable membrane; (B) a fluid dispensing apparatus comprising: (1) a valve body having a top, a bottom and a bore that extends through the valve body; (2) an adaptor having a top, a bottom, a bore that extends through the adaptor and a piercing member, wherein the bottom of the valve body is attached to the top of the adaptor and the adaptor bore communicates with the valve body bore; and, (3) a nozzle attached to the top of the valve body and having a bore that is communicatable with the valve body bore. The fluid dispensing apparatus may be operable by attaching the bottom of the adaptor to the paint container to pierce the pierceable membrane with the piercing member to communicate the paint within the paint container with the adaptor bore and thus with the valve body bore. The nozzle may be operable to permit the paint within the paint container to flow under the pressure out of the paint container, through the adaptor bore, through the valve body bore and through the nozzle bore to ambient.

III. BRIEF DESCRIPTION OF THE DRAWINGS

In the accompanying drawings, structures are illustrated that, together with the detailed description provided below, describe exemplary embodiments of the claimed invention. The invention may take physical form in certain parts and arrangement of parts, embodiments of which will be described in detail in this specification and illustrated in the accompanying drawings which form a part hereof and wherein:

IV. DETAILED DESCRIPTION

Figure 1:
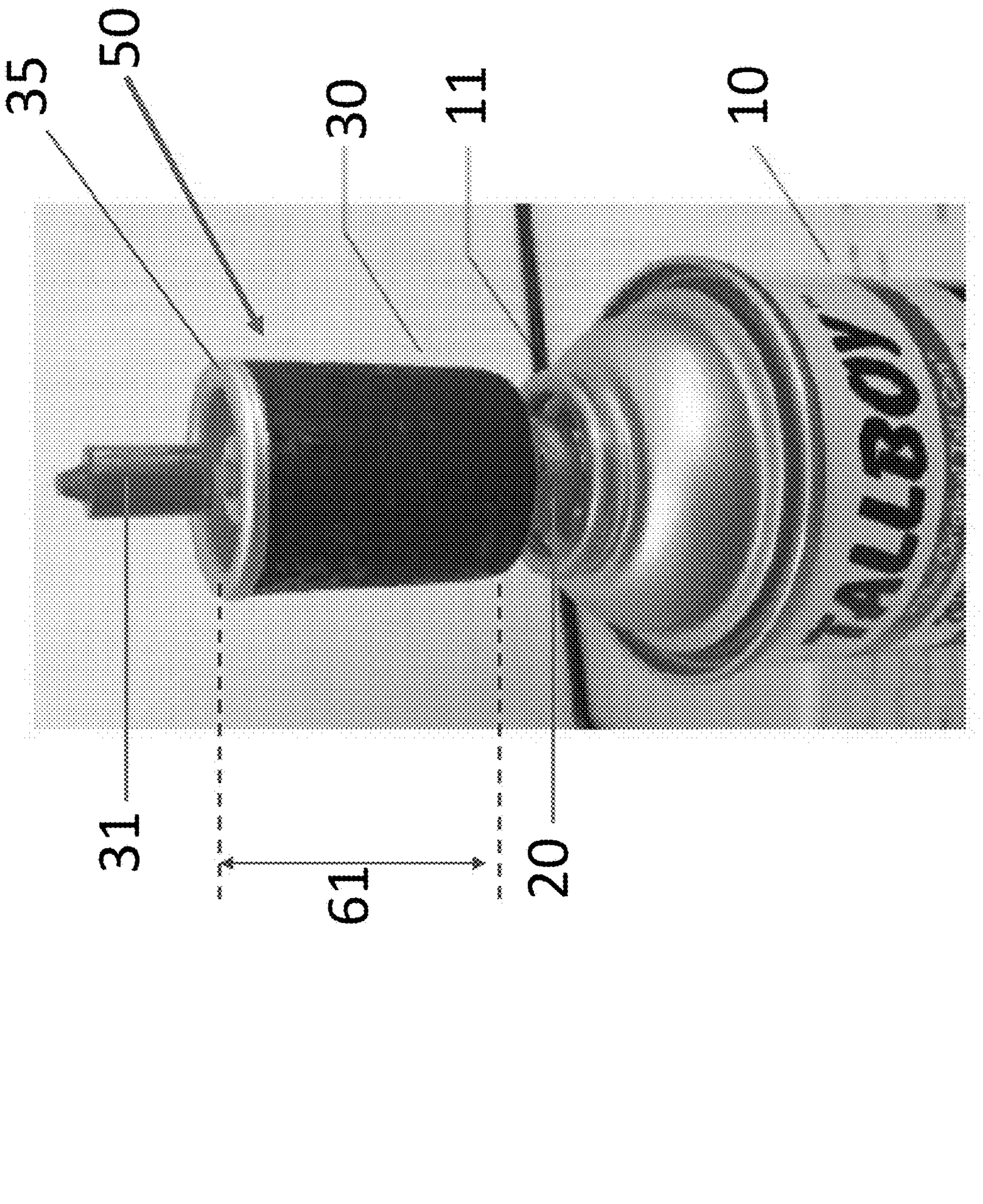
FIG. 1 is a perspective view of a fluid dispensing apparatus in accordance with some embodiments of this invention.

Referring now to the drawings wherein the showings are for purposes of illustrating embodiments of the invention only and not for purposes of limiting the same, and wherein like reference numerals are understood to refer to like components, FIG. 1 shows a perspective view of a pressurized paint container 10 equipped with a fluid dispensing apparatus 50 according to some embodiments of this invention. While the pressurized paint container shown is a can, this invention will work with any type, size and shape of pressurized paint container chosen with the sound judgment of a person of skill in the art. The paint dispensed by the fluid dispensing apparatus 50 may be a pressurized paint fluid that is a liquid, gas, vapor, or a mixture thereof. While the fluid dispensing apparatus 50 is designed to dispense paint, it may have application to other fluids as well.

With continuing reference to FIG. 1, the fluid dispensing apparatus 50 may, in some embodiments, include a nozzle 31, a valve body 30, and an adaptor 20. The nozzle 31 may be like nozzle 202 discussed above. Because the operation of such nozzles 31, 202—laterally displaceable to permit the contents to exit the nozzle and biased into a non-displaced position where the contents cannot exit the nozzle—are well known to people of skill in the art, no details will be provided here.

Figure 3:
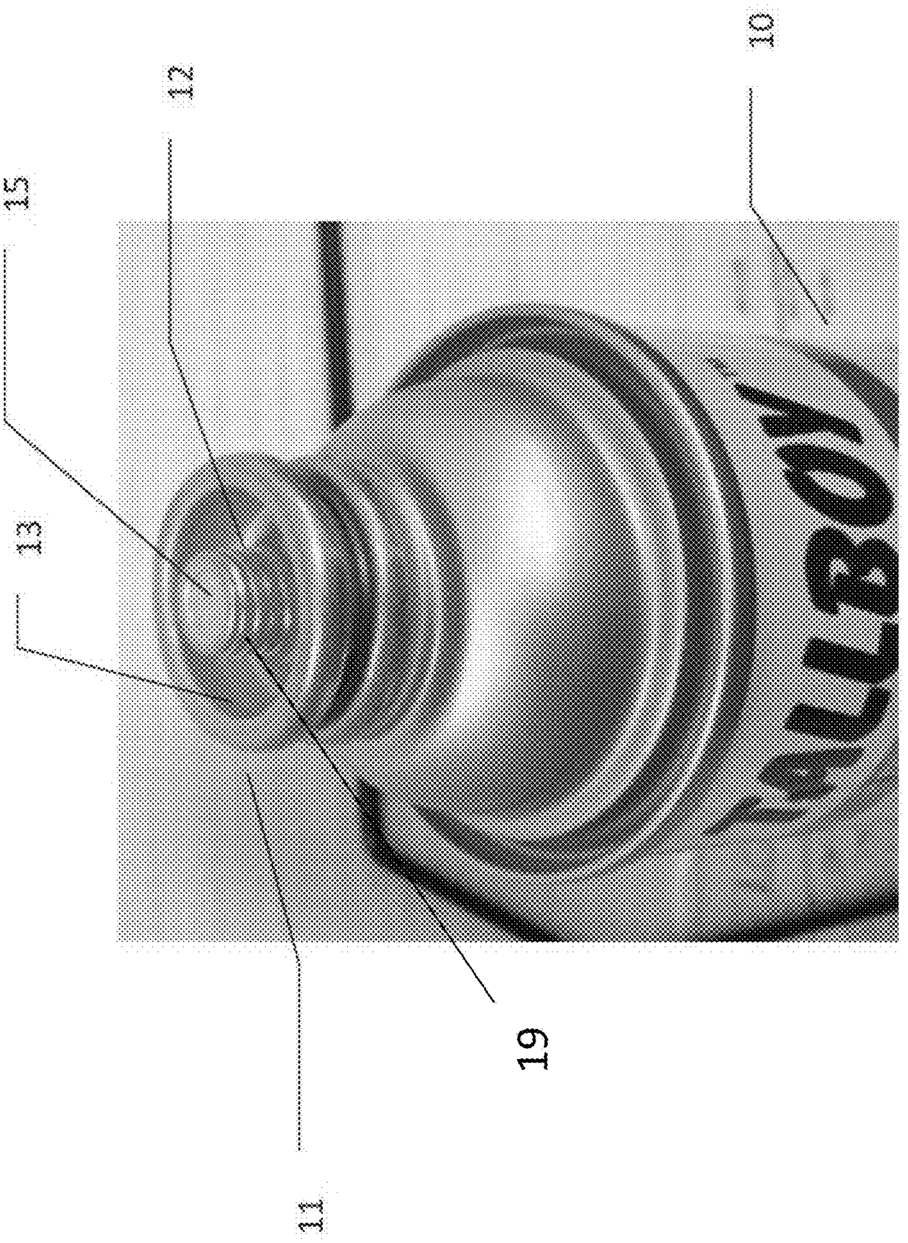
FIG. 3 is a perspective view of a paint container in accordance with some embodiments of this invention.
Figure 6:
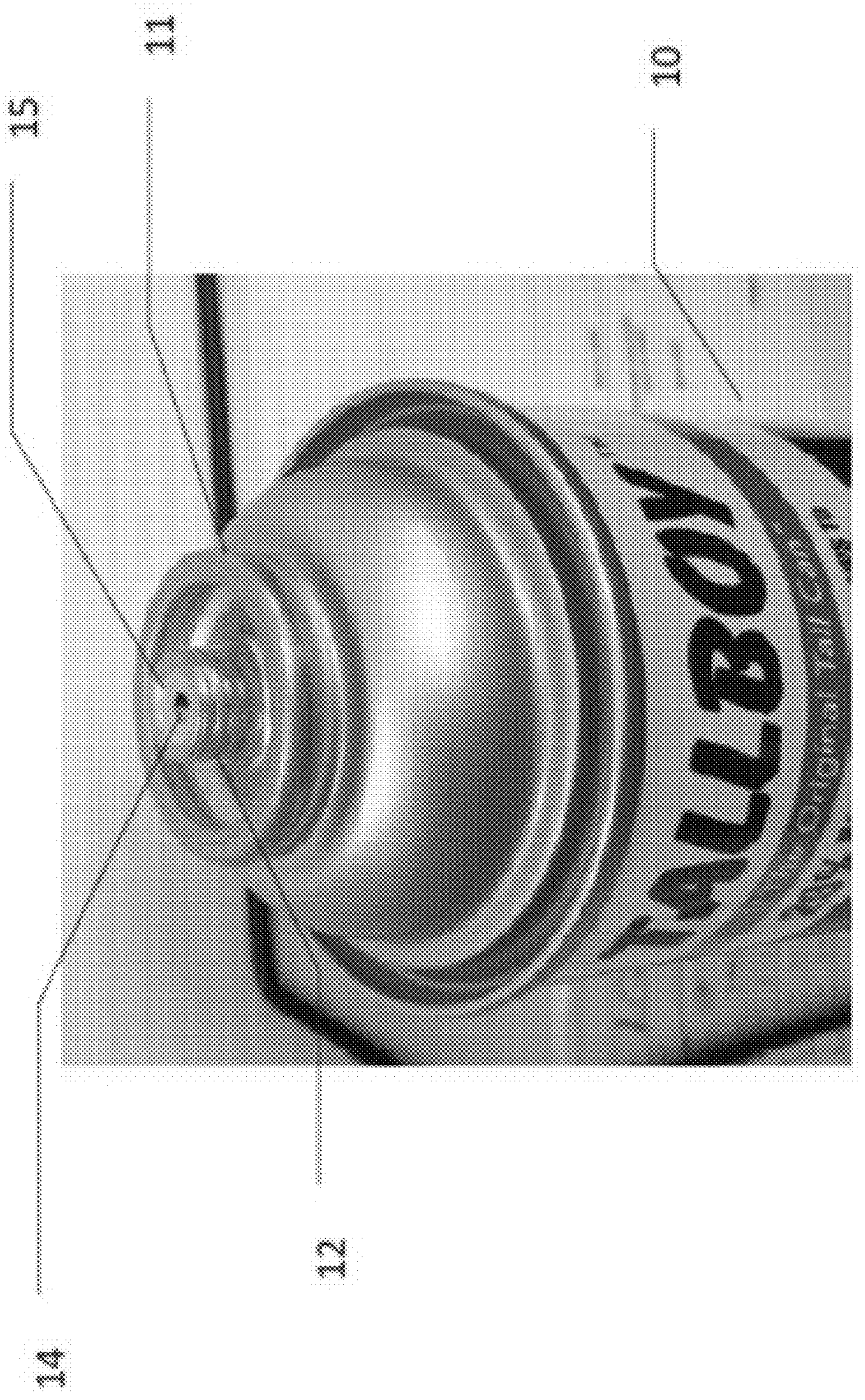
FIG. 6 shows a container in accordance with some embodiments of this invention with a pierceable membrane pierced.

With reference now to FIGS. 3 and 6, in order to use the fluid dispensing apparatus, it may be necessary to attach a container cap 11 to the pressurized container 10. The container cap 11 may, in one embodiment, be fixedly joined to the top of the pressurized container 10 such as being crimped in a known manner. The container cap 11 may be, in one embodiment, positioned substantially concentrically with the container's longitudinal axis. The container cap 11 may have a well 13, a coupling element 12, and a fluid passage bore 14 (visible in FIG. 6). A membrane 15 may cover the bore 14. Membrane 15 may be pierceable and located with respect to fluid passage bore 14 in such a manner as to seal bore 14 and prevent fluid from exiting container 10 until it is pierced. FIG. 6 shows membrane 15 in a pierced condition which exposes fluid passage bore 14 to outside of the pressurized container 10. In one embodiment, shown, the membrane 15 may be fixedly attached to the coupling element 12. Coupling element 12 may be of any size, shape and relative position chosen with the sound judgment of a person of skill in the art. In one embodiment coupling element 12 may have a threaded section 19, as shown. For the embodiment shown, the coupling element 12 is cylindrical in shape and the threaded section 19 is on the exterior surface of the coupling element 12. Materials used to form container cap 11 may be chosen with the sound judgment of a person of skill in the art.

Figure 4A:
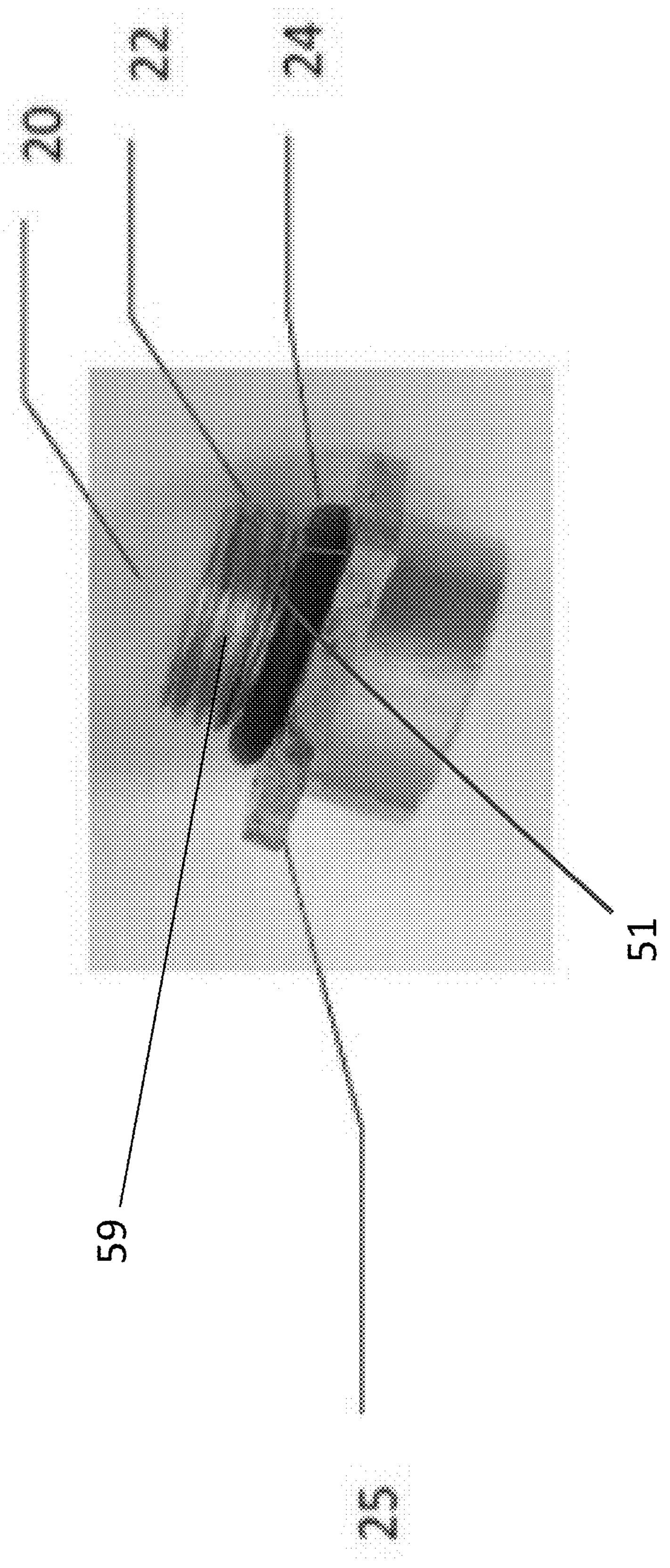
FIG. 4A is a perspective side view of an adaptor in accordance with some embodiments of this invention.
Figure 4B:
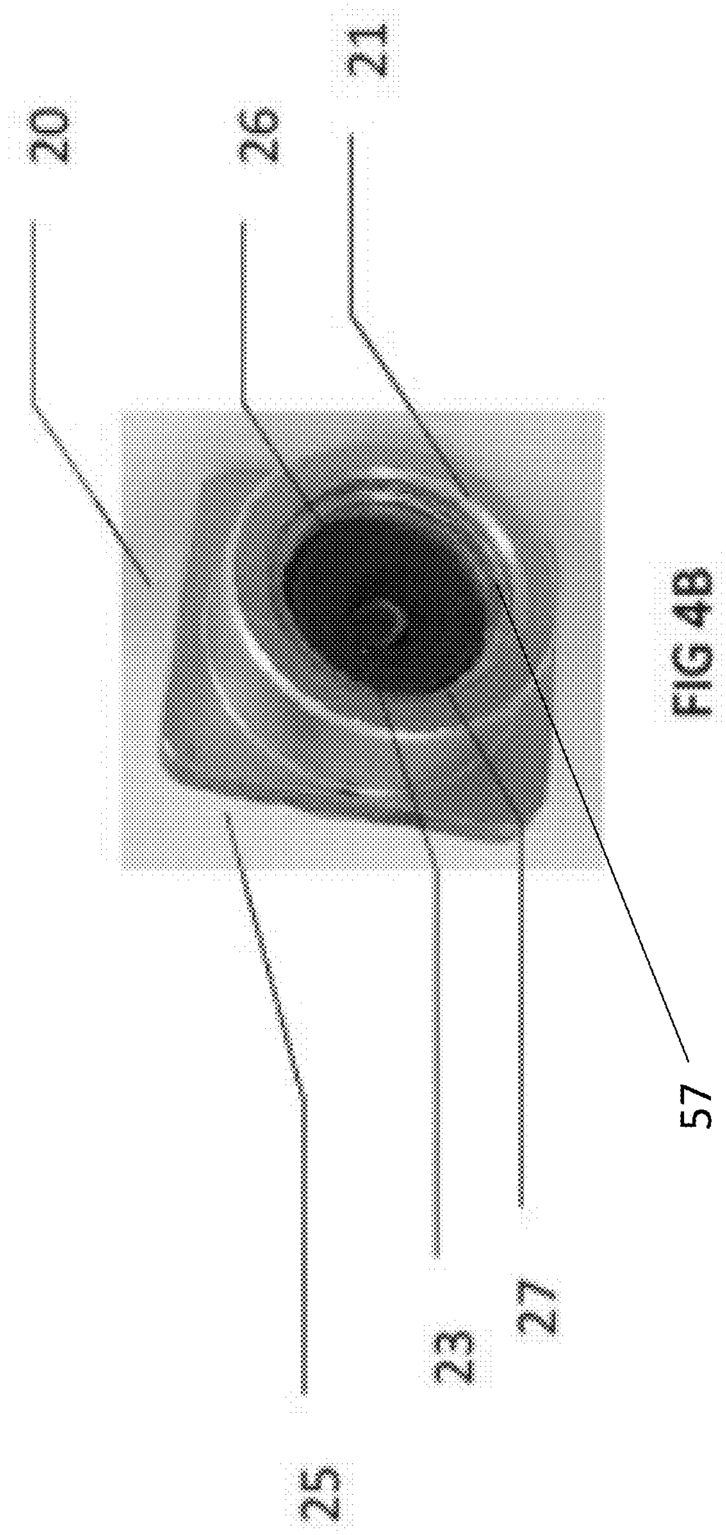
FIG. 4B is a perspective bottom view of an adaptor in accordance with some embodiments of this invention.

With reference now to FIGS. 1, 4A, 4B and 6, embodiments of adaptor 20 will now be described. Adaptor 20 may be, in some embodiments, a generally cylindrically shaped component with a top and an opposing bottom. Referring to FIG. 4B, located on the bottom of adaptor 20 may be a coupling element 21. Coupling element 21 may engage with coupling element 12 of container cap 11. In one specific embodiment, shown, coupling element 21 may be formed on an inner cylindrical shaped portion of adaptor 20 and may have a threaded section 57. The adaptor 20 may have a fluid passage bore 26 that may extend from the top to the bottom of the adaptor 20. The adaptor 20 may also have a piercing member 27 used to pierce membrane 15 (shown unpierced in FIG. 3 and pierced in FIG. 6). The piercing member, in some embodiments, may be located concentric to the longitudinal axis of fluid passage bore 26 and may extend beyond bottom surface of fluid passage bore 26. The piercing member may be positioned at least partially within the adaptor bore 26. On the end of piercing member 27 that extends beyond the bottom surface of bore 26, a tip may be formed and configured to pierce membrane 15. The adaptor 20 may also have a seal 23 that prevents fluid flow except through the bore 26. The seal 23 may be formed of an elastomeric material.

With reference now to FIG. 4A, located on the top of the adaptor 20 may be a coupling element 22. In one specific embodiment, shown, coupling element 22 may be formed on an outer cylindrical shaped portion of adaptor 20 and may have a threaded section 59. The coupling element 22 may be used to engage with a coupling element of the valve body 30, as will be discussed further below. A seal 24 may be used to seal the connection between the top of the adaptor 20 and the bottom of the valve body 30. For the embodiment shown, the seal 24 is an O-ring received around the cylindrically shaped portion of the adaptor 20 that has the coupling element 22. The seal 24 may be formed of an elastomeric material. The adaptor 20 may have a shoulder 25 extending outwardly, as shown. The top of the shoulder 25 may have a surface 51 that acts as a stop that contacts a surface of the valve body 30 when the adaptor 20 and valve body 30 are attached together. The adaptor 20 may be formed of any material(s) chosen with the sound judgment of a person of skill in the art. In one embodiment, the adaptor 20 is formed of copper.

Figure 5:
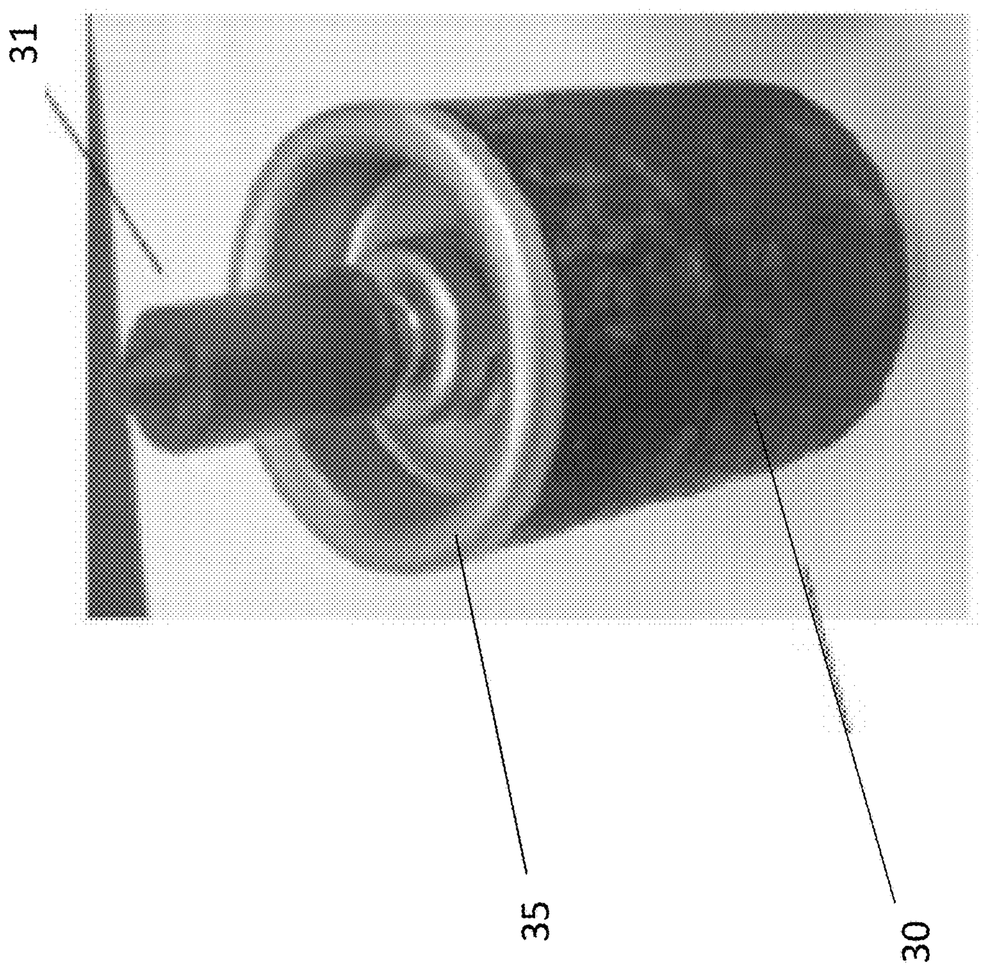
FIG. 5 is a perspective view of a dispensing apparatus in accordance with some embodiments of this invention.
Figure 10:
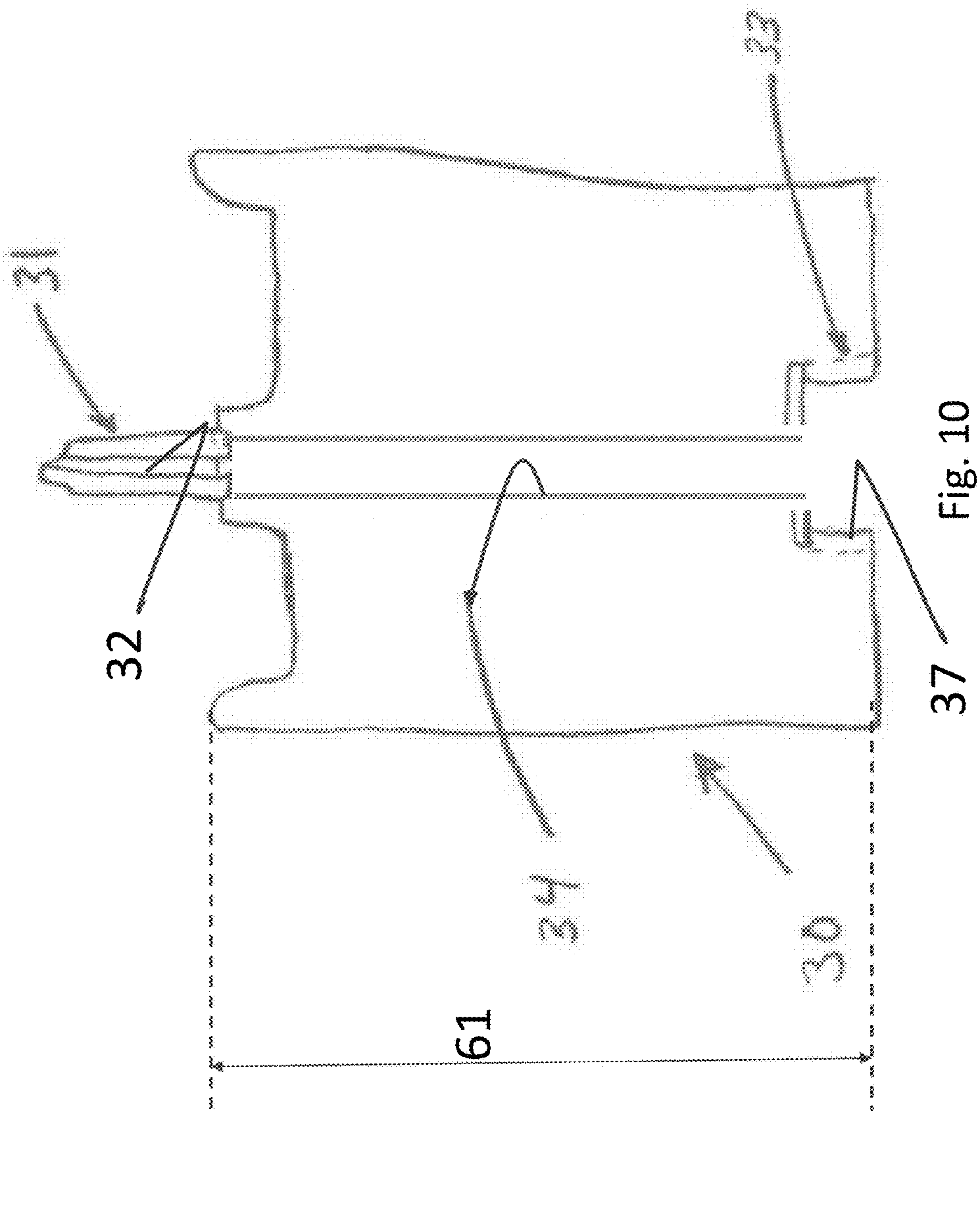
FIG. 10 shows a sectional view of a valve body in accordance with some embodiments of this invention.

With reference now to FIGS. 1, 5 and 10, embodiments of the valve body 30 will now be described. The valve body 30 may have a valve cap 35 on its top, as shown. The valve cap

35 may have any design suitable to properly receive the nozzle 31 as chosen by a person of skill in the art. In one embodiment, shown, the valve cap 35 is similar in design to the top of the can 200, just below the nozzle 202, shown in FIG. 2. The valve body 30 may be substantially cylindrical in shape and may have a height 61. The height 61 may range between 1.0 to 4.0 inches. Valve body 30 may have a fluid passage bore 34, as shown in FIG. 10. The bore 34 may extend from bottom to the top of the valve body 30, as shown. In one embodiment, the bore 34 may be centered along the valve body's longitudinal axis. A coupling element 33 may be located on a bottom surface, as shown. In one specific embodiment, shown, coupling element 33 may be formed on an inner cylindrical shaped portion of valve body 30 and may have a threaded section 37. The coupling element 33 may be used to engage with coupling element 22 of the adaptor 20. In one specific embodiment, threaded section 37 engages threaded section 59 to attach the valve body 30 to the adaptor 20. The valve body 30 may be formed of any material chosen with the sound judgment of a person of skill in the art.

Figure 2:
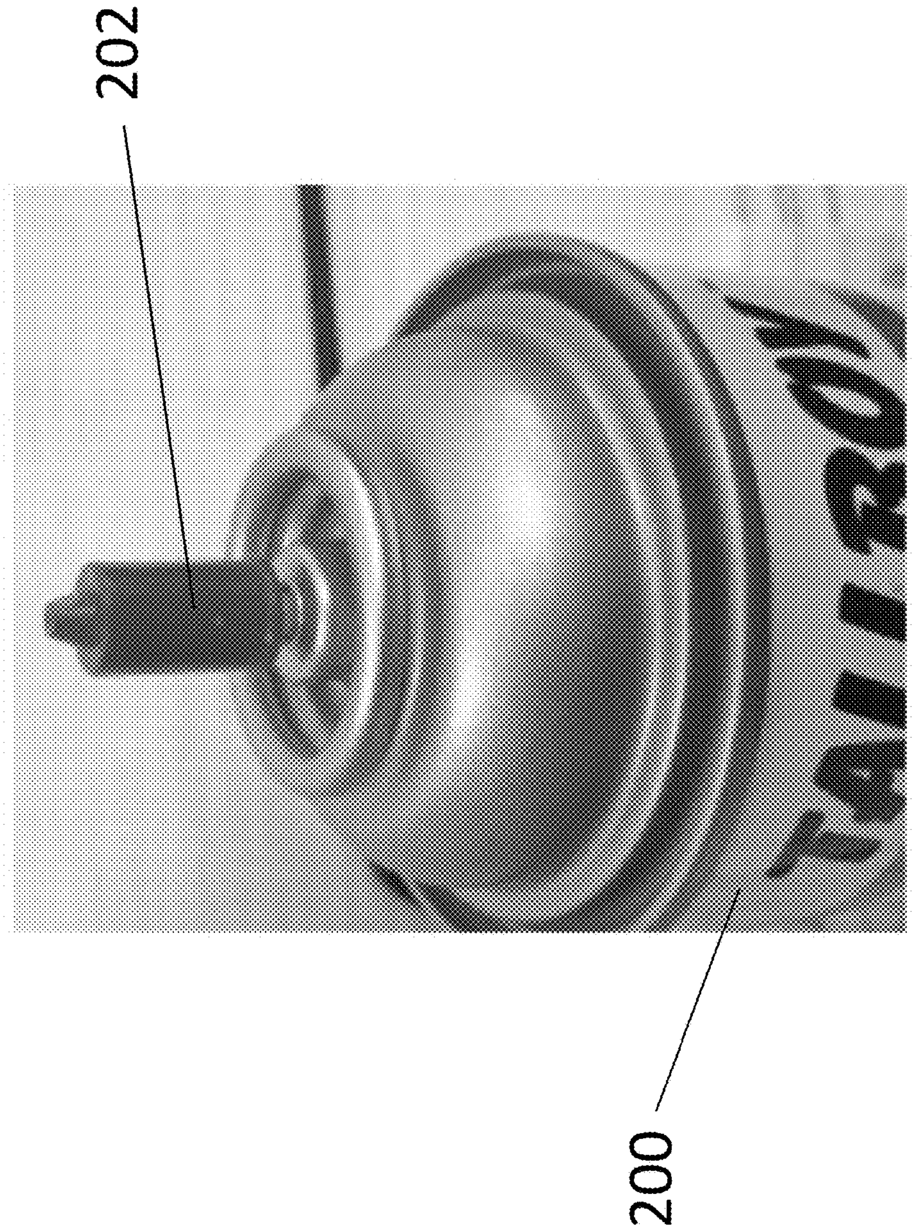
FIG 2 PRIOR ART
FIG. 2 is a perspective top view showing a prior art paint can and nozzle.

With reference now to FIGS. 1, 5 and 10, the nozzle 31, which may have a fluid passage bore 32, may be joined to the valve cap 35 in a known manner—similar to how the nozzle 202 is joined to can 200 in FIG. 2. Nozzle 31 may dispense paint out of the valve body 30 to the ambient when the nozzle 31 is operated in a known manner (similar to nozzle 202 in FIG. 2). Specifically, nozzle 31 may be configured such that it can be selectively deflected from its longitudinal axis and when so deflected its bore 32 is in fluid communication with central bore 34. Nozzle 31 may be configured such that it is capable of being deflected by manually generated forces. Nozzle 31 may also be configured with a biased position such that when no force is applied, nozzle 31 returns to a position that prevents fluid communication with central bore 34.

Figure 11:
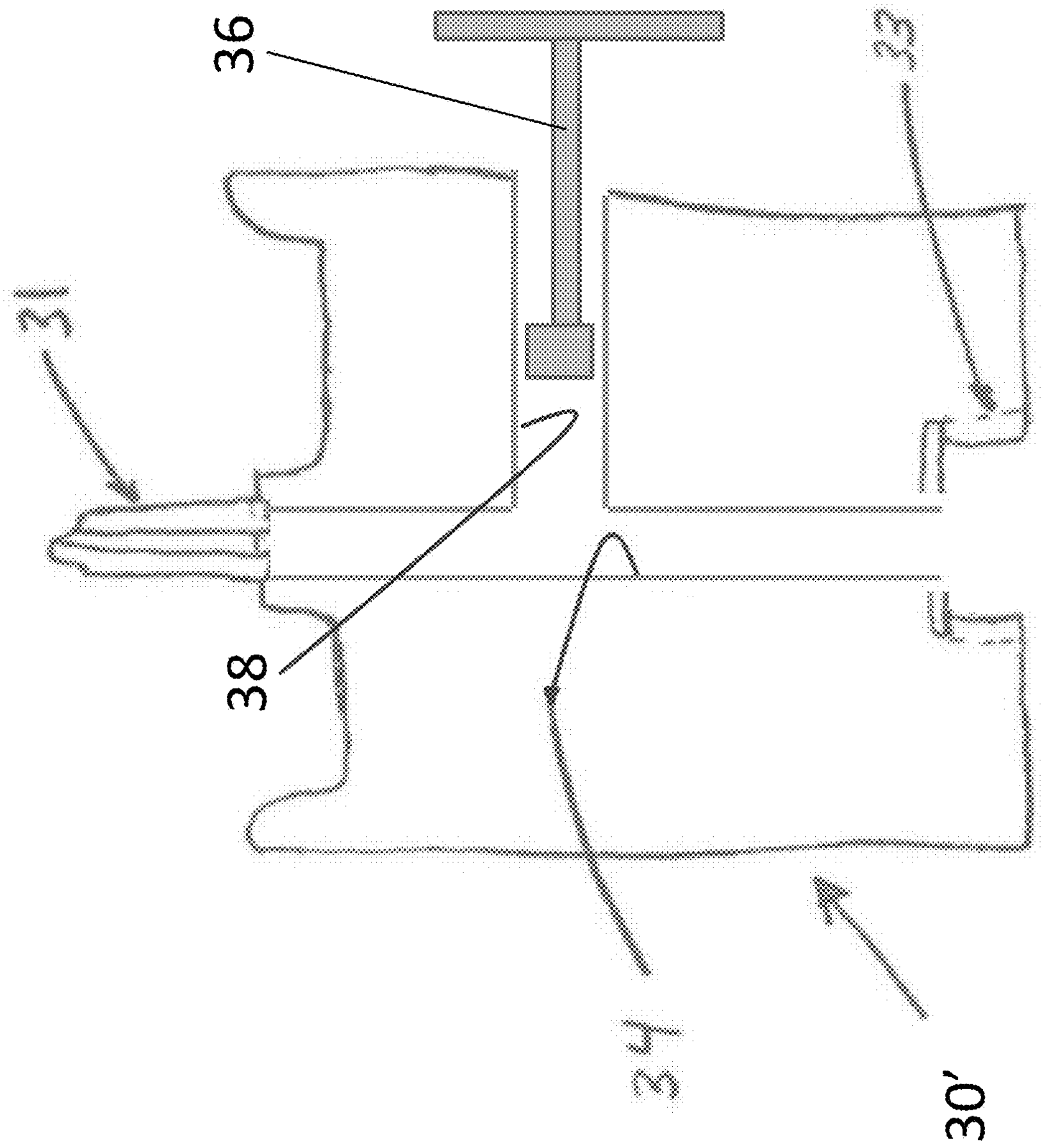
FIG. 11 shows a sectional view of a valve body with pressure relief valve in accordance with some embodiments of this invention.

FIG. 11 illustrates another embodiment valve body 30'. Valve body 30' is similar to valve body 30 described above except that it may include a pressure relief valve 36. In this embodiment valve body 30' may include a transverse fluid passage bore 38. Bore 38 may communicate on one end with bore 34 and on the opposing end with the area outside of the confines of valve body 30'. Located in bore 38 may be pressure relief valve 36. Pressure relief valve 36 may be chosen to operate in a plurality of modes. One mode may be such that in an initial condition relief valve 36 substantially seals bore 38 from the area outside. A second mode may be, once the user depresses relief valve 36, transverse bore 38 connects central bore 34 with the area outside of the confines of valve body 30'. Operating in this second mode, when attached to valve body 30', the pressure inside container 10 is minimized or released to the ambient without the fluid also being dispensed to the ambient. A third mode is the relief valve 36 opens automatically when pressure inside the paint container 10 exceeds a predetermined value. When this occurs, the pressure inside container 10 is minimized or released to ambient. Materials used in forming pressure relief valve 36 may be chosen with the sound judgment of a person of skill in the art. The operation modes of pressure relief valve 36 may also be chosen with the sound judgment of a person of skill in the art.

Figure 14:
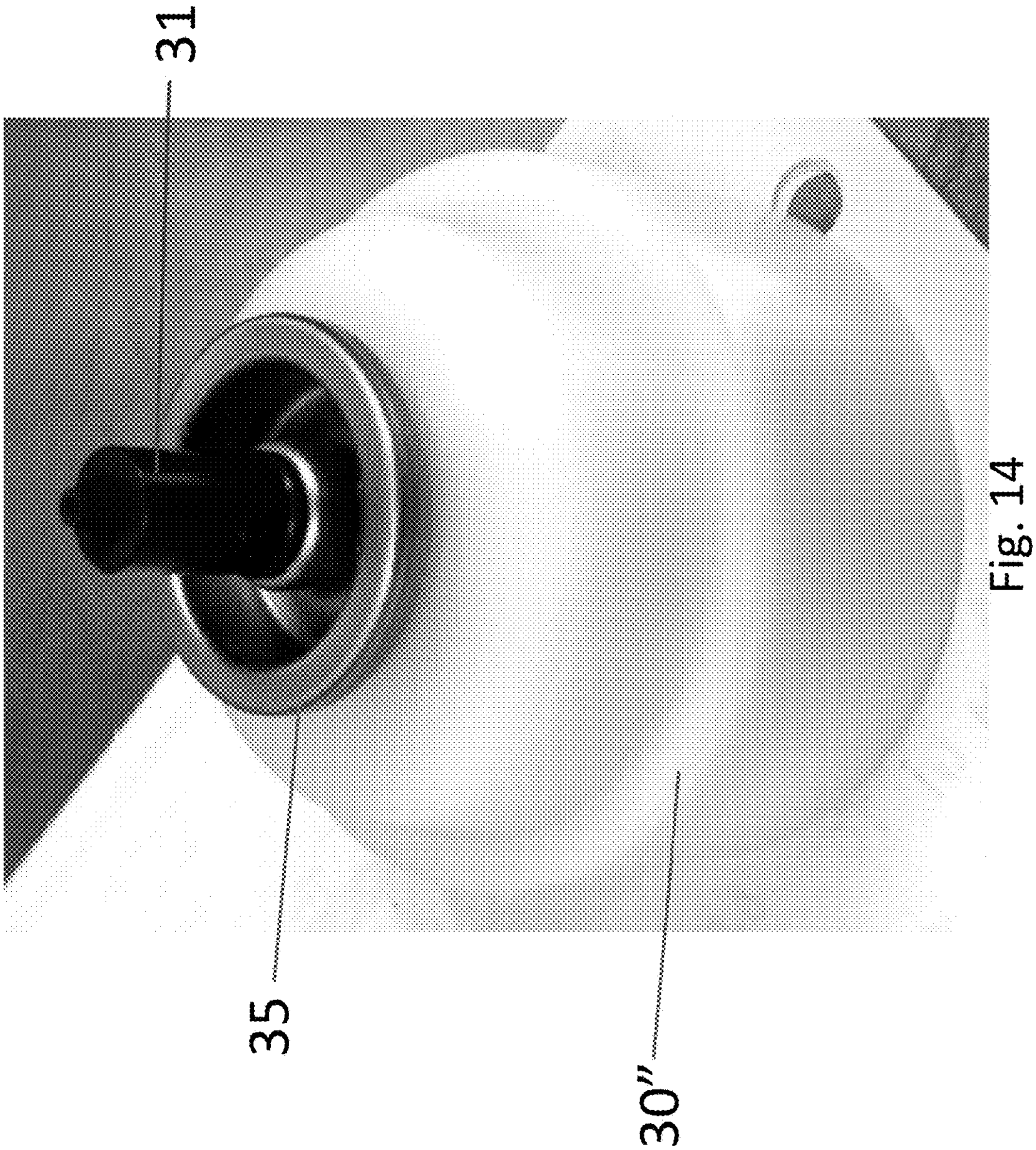
FIG. 14 is a top perspective view of a valve body according to some embodiments of this invention.
Figure 15:
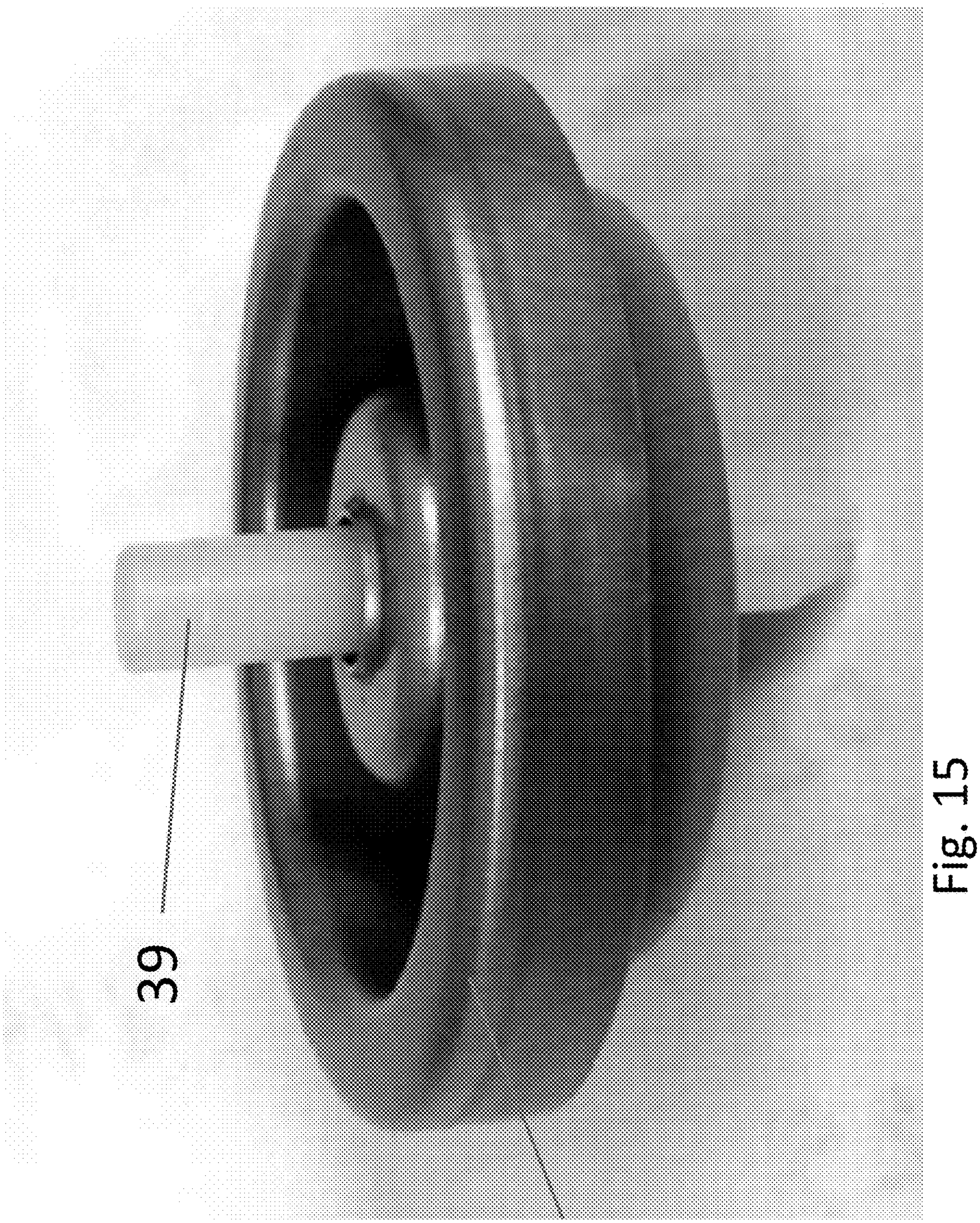
FIG. 15 is a side perspective view of a valve cap according to some embodiments of this invention.

With reference now to FIGS. 14 and 15, another embodiment valve body 30" is shown. Valve body 30" has a valve cap 35 and attaches to a nozzle 31 as with previously described valve bodies 30 and 30'. Valve body 30", however, is designed to resemble the size and shape of the container. Compare FIG. 14 with FIG. 2. FIG. 15 shows stem 39 which extends through the valve cap 35 and is used to operate nozzle 31 in a known manner.

Figure 7:
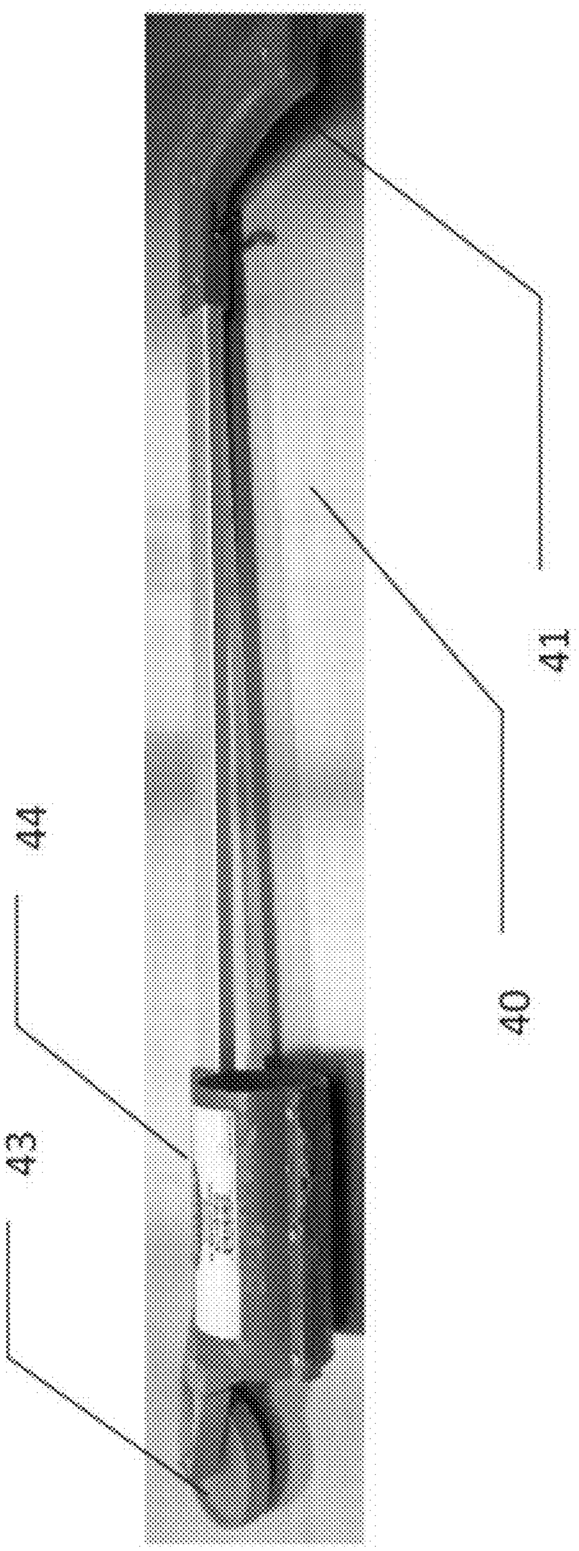
FIG. 7 shows a perspective view of a dispensing wand in accordance with some embodiments of this invention.
Figure 8:
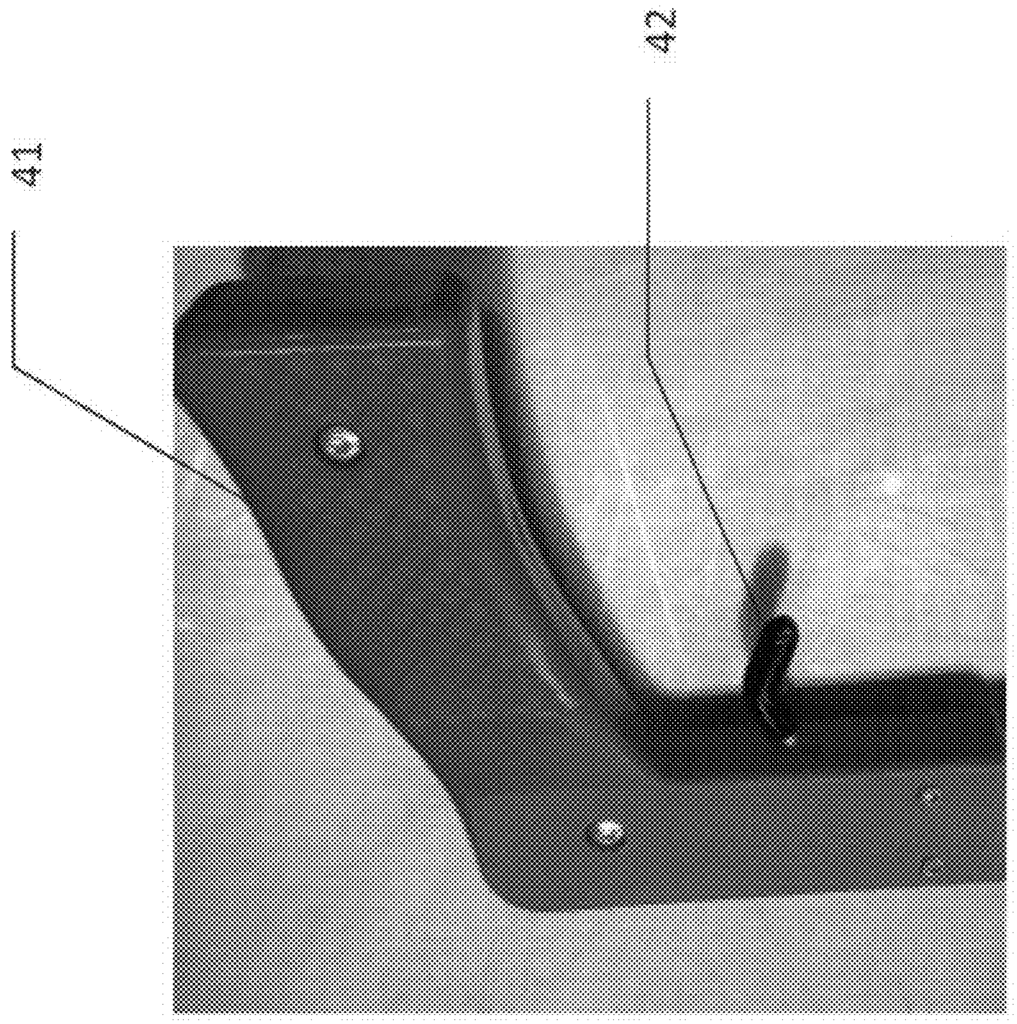
FIG. 8 is a perspective close-up view showing the grip and trigger of a dispensing wand in accordance with some embodiments of this invention.
Figure 9:
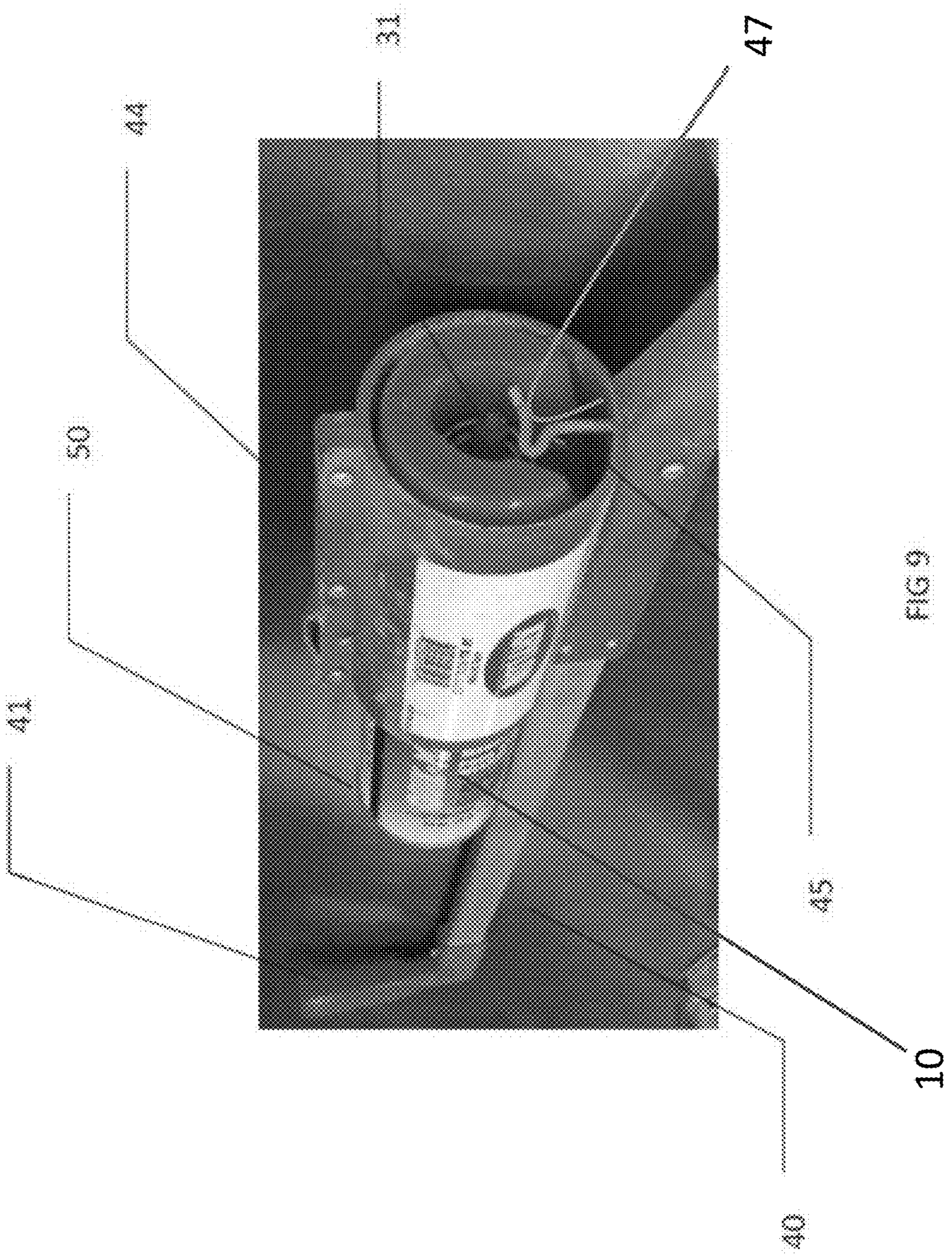
FIG. 9 shows an end perspective view of a dispensing wand in accordance with some embodiments of this invention.

With reference now to FIGS. 7-9, in another embodiment a dispensing wand 40 may be used. On one end of dispensing wand 40 may be positioned a grip 41 configured to allow a user to easily hold wand 40. Also on grip end of wand 40 may be trigger 42, seen best in FIG. 8. The opposing end of wand 40 may contain a wheel 43 which may be rotationally attached to wand 40 in such a manner as to allow wand 40 to easily be moved along a surface by a user as the wheel 43 rolls along the surface. Also on opposing end of wand 40 may be a receiving portion 44 of such a size and shape to securely retain container 10 to the wand 40. While the receiving portion 44 can be of any type chosen with the sound judgment of a person of skill in the art, for the embodiment shown the receiving portion 44 includes an opening 47, see FIG. 9, into which the pressurized container 10 may be inserted. Located within receiving portion 44 may be a nozzle lever 45. A nozzle lever 45 may be operatively connected to trigger 42. This connection may be such that a user may manually apply a force to trigger 42, thus displacing trigger 42, and this displacement results in nozzle lever 45 also being displaced.

Figure 12:
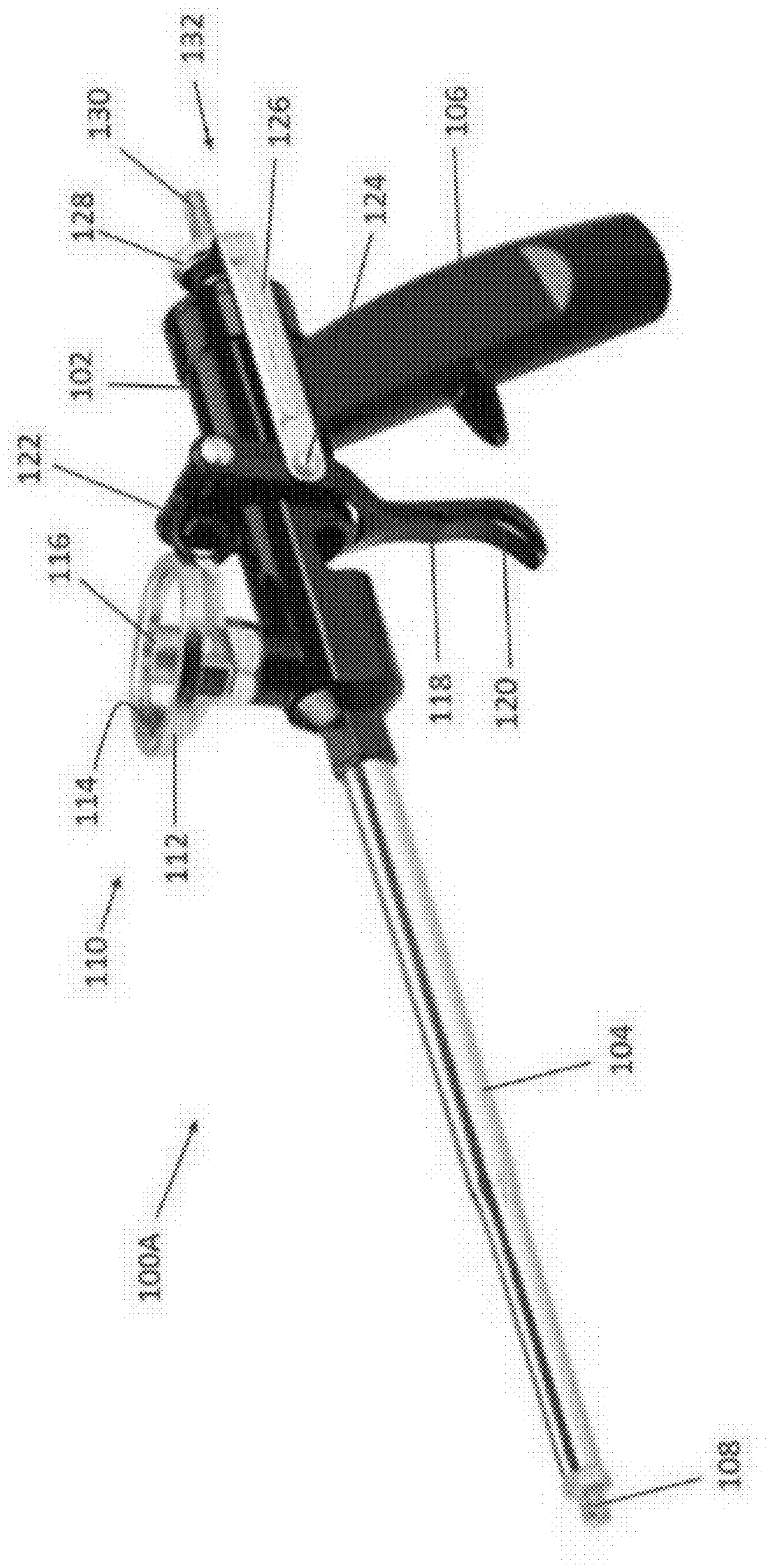
FIG. 12 is a side perspective view of a spray apparatus according to some embodiments of this invention.

With reference now to FIGS. 1, 2, 12 and 13, spray apparatuses 100A, 100B are shown. Because many of the components are similar, many of the same reference numbers will be used in both. Each spray apparatus 100A, 100B may include a housing 102, a barrel 104 supported to the housing 102 and a handle 106 also supported to the housing 102. For the embodiments shown, the spray apparatuses 100A, 100B may have a pistol-shape but other shapes may work well also. The barrel 104 may be hollow and may extend distally (away from the handle) to a tip 108. The hollow barrel 104 and tip 108 may define a fluid passageway bore. In one embodiment, the tip 108 is the distal end of the apparatus 100A, 100B and the point from which paint fluid is dispensed. In another embodiment, the tip 108 comprises a fitting to which another component (not shown) may be attached and from which the paint fluid is dispensed. The barrel 104 may decrease in outside diameter, as shown in FIG. 12, in the distal direction.

Figure 13:
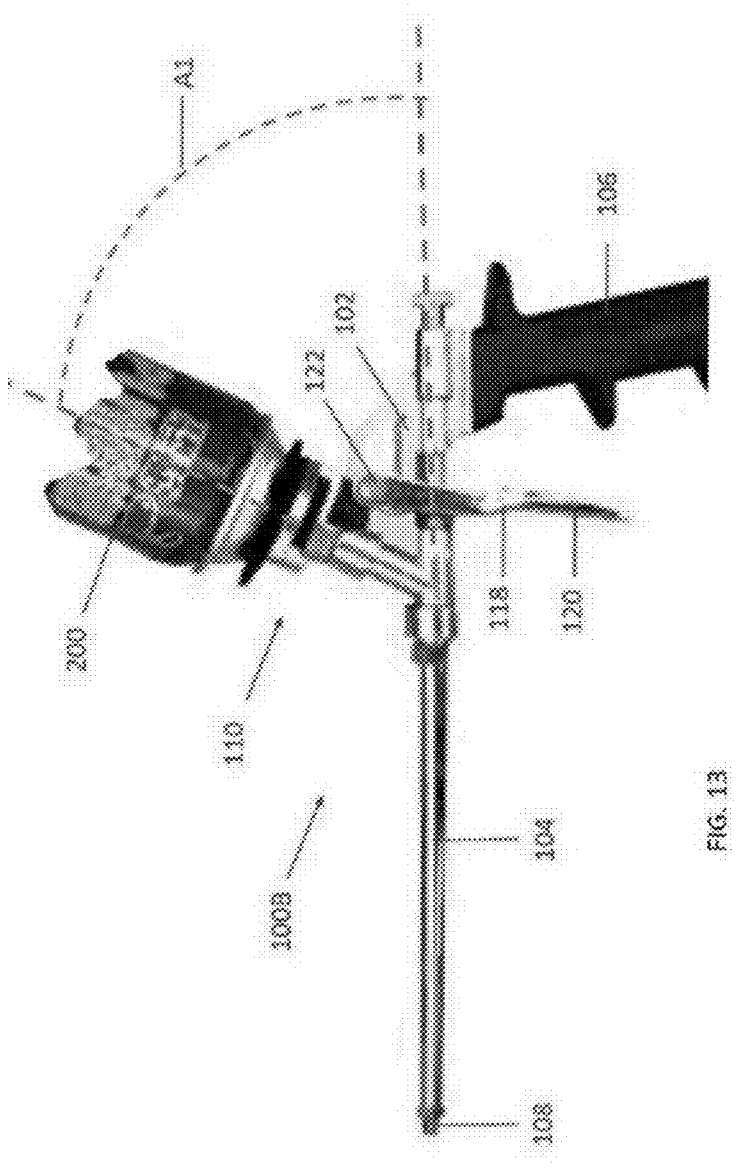
FIG. 13 is a side view of a spray apparatus with a can, only a portion shown, attached to the can receiving portion.

With continued reference to FIGS. 12 and 13, a container receiving portion 110 may be supported to the housing 102 and sized and shaped to securely retain/support a paint container 10 or 200. For the embodiment seen best in FIG. 12, the container receiving portion 110 may include an outer, generally circular ring 112 defining an opening 114, and a nozzle reception connector 116. The user may attach the pressurized container 10, 200 to the apparatus 100A, 100B, as shown in FIG. 13, such that the nozzle 31, 202 is received within the nozzle reception connector 116 and the valve body 30 or top of can 200 is received within the opening 114. The nozzle reception connector 116 communicates with the fluid passageway in the barrel 104 so that the fluid paint within the pressurized container 10, 200 can be dispensed out the tip 108, when desired. For the embodiments shown, the container receiving portion 110 is positioned on a top portion of the apparatus 100A, 100B. As a result, gravity assists in assuring that all the liquid within the container is used. The receiving portion 110 may extend from the apparatus at an angle A1, as shown in FIG. 13, with respect to the longitudinal axis of the housing 102 and/or barrel 104. Angle A1 may be, in one embodiment, between 0 degrees and 90 degrees. In another embodiment, angle A1 may be between 10 degrees and 80 degrees. In yet another embodiment, angle A1 may be between 20 degrees and 70 degrees. For the embodiment shown, angle A1 is approximately 75 degrees.

Still referring to FIGS. 12 and 13, the spray apparatus 100A, 100B may also include a trigger 118 which is moveable relative to the housing 102 in order to deflect the nozzle 31, 202 to dispense the paint fluid. The trigger 118 may have a first end with a user contact surface 120 and a second end with a discharge contact surface 122. When the trigger 118 is manually operated, in one embodiment moved, by the user, such as by squeezing the user contact surface 120 toward the handle 106 with the user's hand, the discharge contact surface 122 contacts the nozzle 31, 202 to deflect it and dispense the fluid. The trigger 118 may be moveably attached to the housing 102 in any manner chosen with the sound judgment of a person of skill in the art.

For the embodiment shown in FIG. 12, the second end of the trigger 118 has a U-shaped portion with legs that extend juxtaposed to opposite sides of the housing 102 and pivots about pivot pin 124 which is received through the legs and through the housing 102. In an alternate embodiment, one pivot pin connects one leg to the housing on one side and a second pivot pin connects the other leg to the housing on the opposite side. To provide container size adjustability, an adjustment mechanism 132 may be used. The adjustment mechanism 132 may include bracket 126 that extends from the trigger 118 to a nut 128 that is threadingly received on a threaded rod 130 that is supported to and extending from the housing 102. For the embodiment shown in FIG. 12, the bracket 126 has an opening that receives the pivot pin 124. In an alternate embodiment, another bracket (not visible) extends from the nut 128 to the trigger 118 on the other side of the apparatus 100A. To adjust the apparatus 100A to fit different sized containers, the nut 128 can be rotated about rod 130 to move the bracket 126 and thus the trigger 118 along the longitudinal axis of the housing 102 (that is, along the longitudinal axis of the barrel 104) either closer to the receiving portion 110 or farther away.

With reference again to FIGS. 12 and 13, to use the spray apparatuses 100A, 100B, the user attaches the container 200 or container 10 equipped with the adaptor 20 and valve body 30, to the container receiving portion 110, as explained above. If necessary, the user adjusts the adjustment mechanism 132 to fit the container. The user then only has to position the tip 108 (or other component that is attached to the tip) to the desired location and then move the trigger 118 with respect to the handle 106 (such as by squeezing the trigger 118 toward the handle 106). The trigger 118 movement deflects the nozzle 31, 202 dispensing the fluid out of the container and out of the tip 108.

Figure 16:
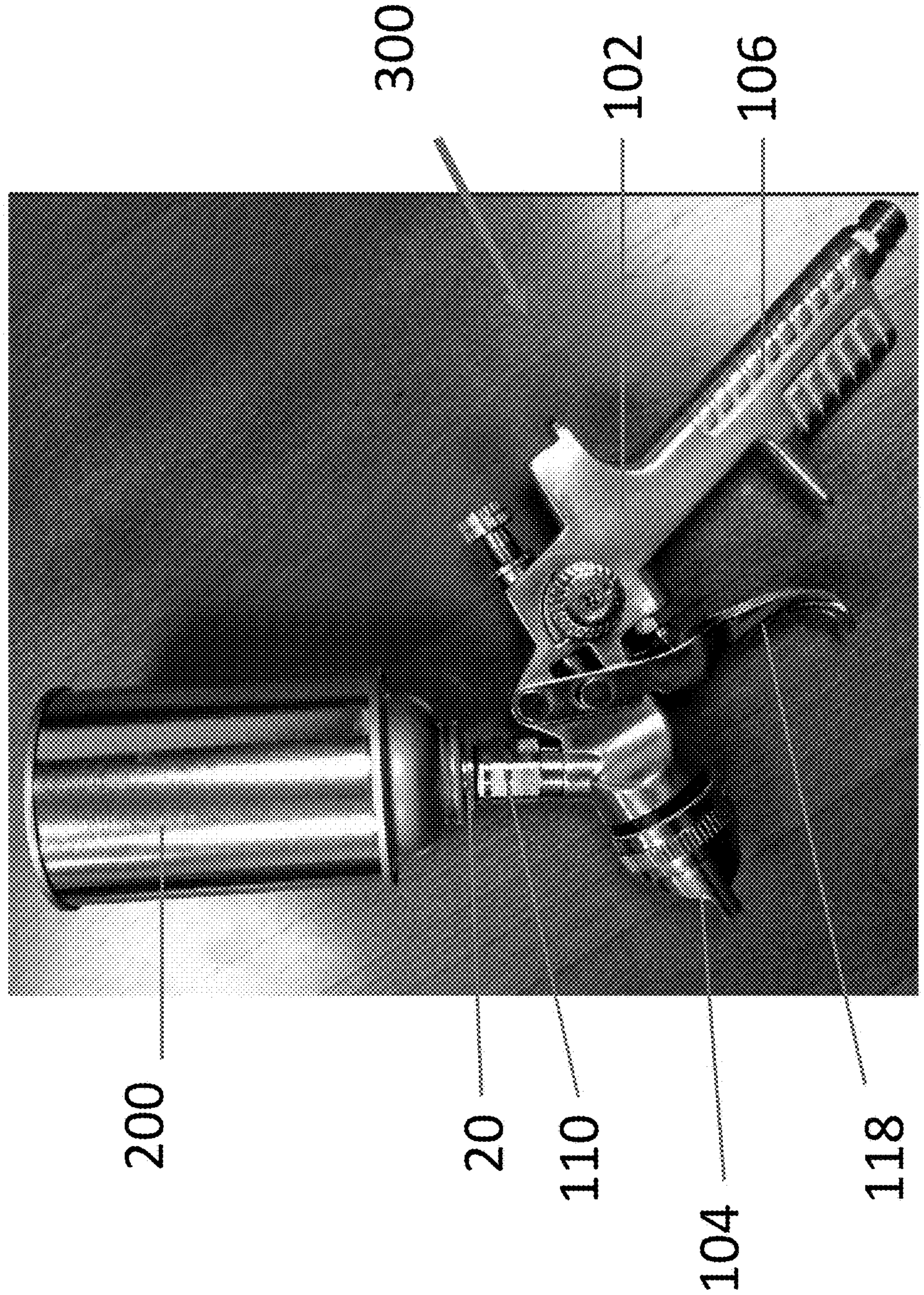
FIG. 16 is a side view of a spray apparatus according to other embodiments of this invention.
Figure 17:
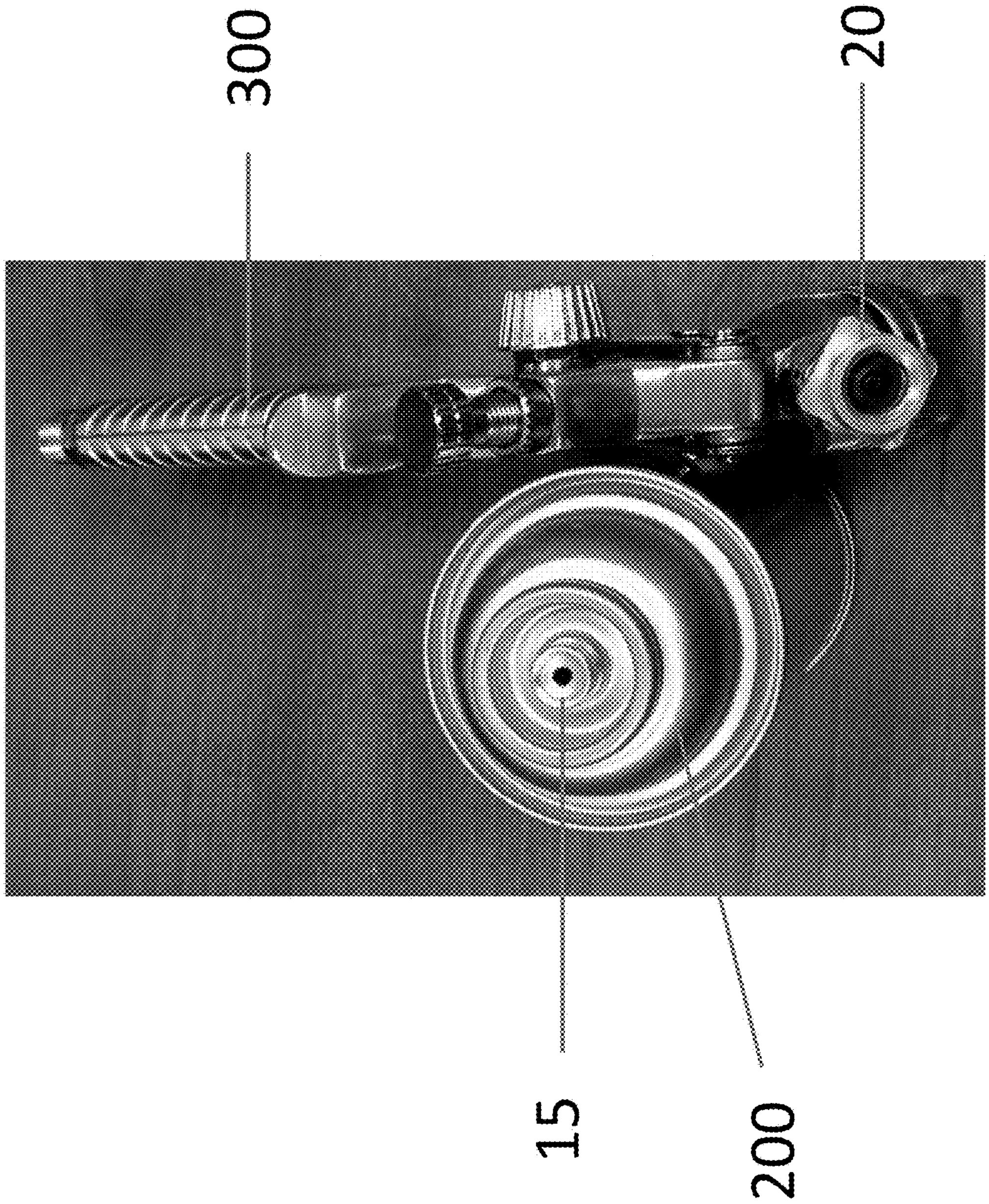
FIG. 17 is a top view of the spray apparatus shown in FIG. 16 but with the paint container detached.
Figure 18:
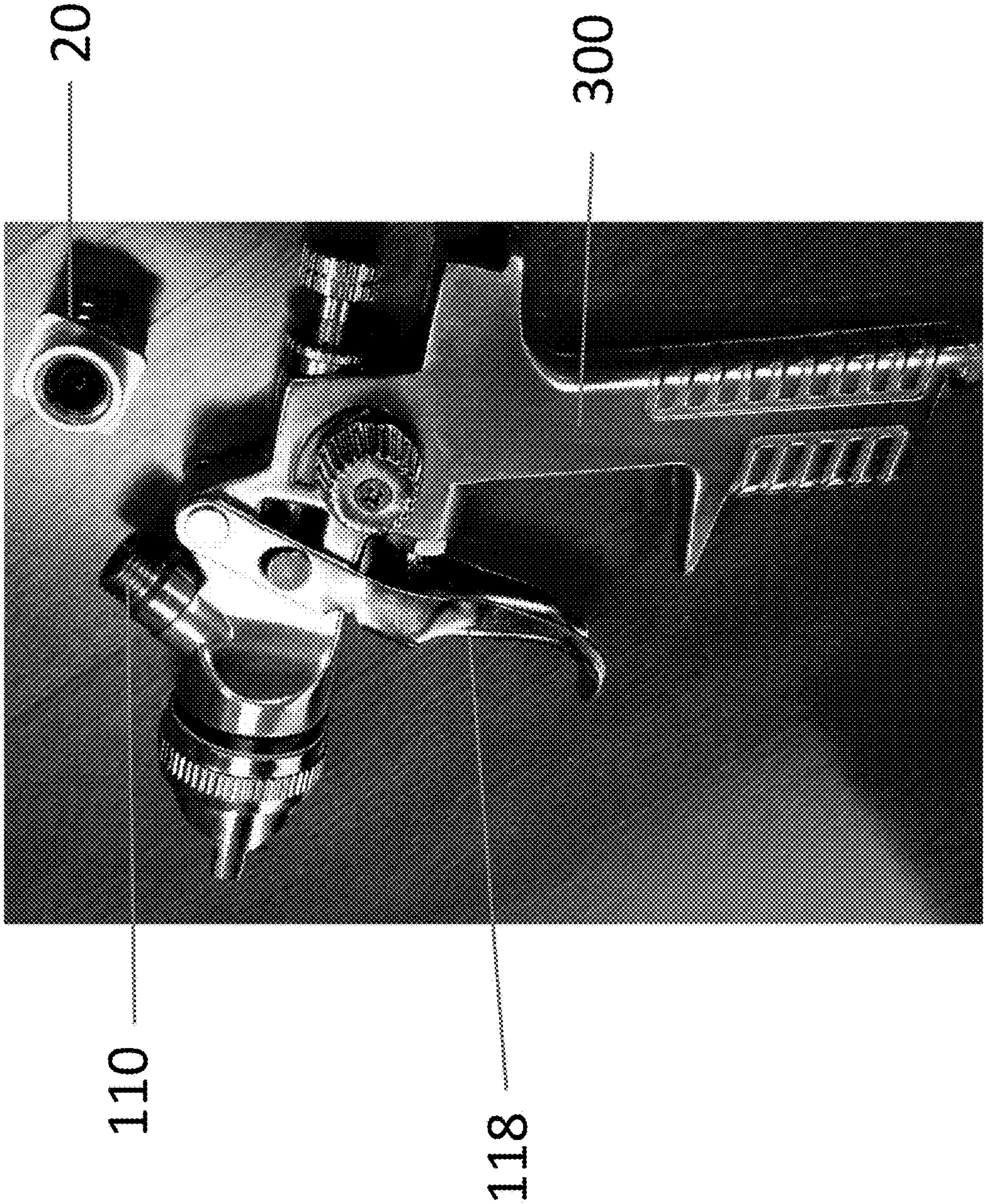
FIG. 18 is a side view of the spray apparatus shown in FIG. 16 but with the adaptor detached and the paint container not shown.

With reference now to FIGS. 16-18, another spray apparatus 300 incorporating embodiments of this invention is shown. As with spray apparatuses 100A, 100B described above, spray apparatus 300 may include a housing 102, a barrel 104 supported to the housing 102, a handle 106 supported to the housing 102, and a trigger 118. FIG. 16 shows the paint container 200 attached to the spray apparatus 300 and FIGS. 17 and 18 show the paint container 200 removed from the spray apparatus 300. FIG. 17 shows the container's pieced membrane 15. Visible in each of these drawings is adaptor 20. In FIG. 16 the adaptor 20 is positioned between the paint container 200 and the container receiving portion 110 of the spray apparatus 300. This is the "use" condition as operating the trigger 188 will permit the paint fluid to exit paint container 20 under a pressure above ambient, flow through adaptor 20, through container receiving portion 110 and to barrel 104. In FIG. 17 the paint container 200 has been removed and the membrane 15 has been pierced. This is the "after use" condition and it is very easy for the user to now dispose of the paint container 200 as all pressure above ambient has been removed. In FIG. 17 the adaptor 20 remains connected to the spray apparatus 300 and could be reused with another pressurized paint container (not shown) if desired. In FIG. 18 the adaptor 20 has been removed from the container receiving portion 110 and thus removed from the spray apparatus 300. The operation of the spray apparatus 300 is similar to the spray apparatuses described above so further details will not be provided here.

With reference now to FIGS. 1 and 3, methods of using fluid dispensing apparatus 50 will now be described. The paint container 10 may be equipped with container cap 11 by the manufacturer, in one embodiment. The fluid dispensing apparatus 50 may come to the user as a kit, in one embodiment, including the adaptor 20 and the valve body 30. In one embodiment, the adaptor 20 may already be attached to the valve body 30. In another embodiment, the coupling element 22 (see FIG. 4A) is attached to coupling element 33 (see FIG. 10) to attach the adaptor 20 to the valve body 30. In one specific embodiment, this may comprise rotating the adaptor 20 with respect to the valve body 30 with threaded section 59 engaged with threaded section 37 to "tighten" them together. This action may compress seal 24 and a lower surface of the valve body 30 may contact surface 51, or come near to contacting it. In another embodiment, the fluid dispensing apparatus 50 may come to the user already attached to the pressurized container 10.

With reference now to FIGS. 1, 3, 4B, 6 and 10, the user then attaches the fluid dispensing apparatus 50 to the paint container 10. In one embodiment, this means attaching the coupling element 21 of the adaptor 20 (see FIG. 4B) with the coupling element 12 of container 10 (see FIG. 3). In one specific embodiment, this may comprise rotating the fluid dispensing apparatus 50 with respect to the paint container 10 with threaded section 57 engaged with threaded section 19 to "tighten" them together. This action may compress seal 23. As the fluid dispensing apparatus 50 is attached to the paint container 10, piercing member 27 (see FIG. 4B) contacts and pierces membrane 15 (see FIG. 3 to see the membrane 15 before it is pierced, and FIG. 6 to see the membrane 15 after it is pierced). Once the membrane 15 is pierced, container bore 14 communicates with adaptor bore 26 which communicates with valve body bore 34. Thus, once the fluid dispensing apparatus 50 is attached to the pressurized container 10, all the user needs to do to dispense the paint is operate nozzle 31, such as by deflecting the nozzle 31, as described above. Thus, operation of the fluid dispensing apparatus 50 with container 10 as shown in FIG. 1 is similar to the use of container 200 and nozzle 202 shown in FIG. 2.

With reference now to FIGS. 7-9, in another embodiment, dispensing wand 40 may be used to dispense paint fluid from paint container 10 using the following method. After the fluid dispensing apparatus 50 is attached to the paint container 10, the user may align the longitudinal axes of wand 40 with the dispensing apparatus 50. Next the user may insert container 10 and dispensing apparatus 50 into receiving portion 44, such as within opening 47, with nozzle 31 in proximity to nozzle lever 45. The user may then hold the wand 40 upright by grip 41 and place wheel 43 on desired surface to be traversed. Next the user may pull trigger 42 using his/her finger thus displacing trigger 42. This displacement may result in nozzle lever 45 also being displaced. The displacement of nozzle lever 45 may then result in nozzle 31 being deflected and the contents of container 10 being dispensed. The user may then wheel wand 40 (that is, move the wand 40 using the wheel 43) and fluid dispensing apparatus 50 with container along a desired path thus easily dispensing paint fluid along the path.

In another embodiment, paint container 10 may be depressurized and substantially emptied of paint fluid according to the following method. The user may uncouple or detach container 10 from adaptor 20 (and thus from fluid dispensing apparatus 50) and separate the two components. With container 10 separated from adaptor 20, pierced membrane 15 is exposed to the ambient thus resulting in container 10 becoming depressurized. Next, container 10 may be substantially emptied of fluid by placing it with pierced membrane 15 facing down and thus using gravity to force the paint fluid out of container 10. At this point paint container 10 may be easily deposed of. The fluid dispensing apparatus 50 may then be reused with another paint container.

Methods of using the apparatuses shown in FIGS. 12 and 13 have been discussed above. It will be noted again, however, that the apparatuses of FIGS. 12 and 13 can be used either with a known paint container such as paint container 200 shown in FIG. 2 or with a fluid dispensing apparatus 50 and paint container 10 according to various embodiments of this invention described above.

The foregoing description of examples and embodiments have been presented for purposes of illustration and description. It is not intended to be exhaustive or limiting to the forms described. Numerous modifications are possible in light of the above teachings. Some of those modifications have been discussed, and others will be understood by those skilled in the art. The examples and embodiments were chosen and described in order to best illustrate principles of various examples as are suited to particular uses contemplated. The scope is, of course, not limited to the examples and embodiments set forth herein, but can be employed in any number of applications and equivalent devices by those of ordinary skill in the art. It will be apparent to those skilled in the art that the above methods and apparatuses may incorporate changes and modifications without departing from the general scope of this invention. It is intended to include all such modifications and alterations.

I claim:

1. A fluid dispensing apparatus for use in dispensing a paint fluid from an associated paint container under a pressure greater than ambient, the associated paint container containing associated paint and having a pierceable membrane and a coupling element on a surface of the associated paint container, the fluid dispensing apparatus comprising:

a valve body having a top, a bottom and a bore that extends through the valve body;

an adaptor having a top, a bottom, a bore that extends through the adaptor, a coupling element on a bottom surface of the adaptor and a piercing member;

a nozzle attached to the top of the valve body and having a bore that is communicatable with the valve body bore;

wherein the bottom of the valve body is attached to the top of the adaptor the adaptor bore communicates with the valve body bore;

wherein the fluid dispensing apparatus is operable by attaching the bottom of the adaptor to the associated paint container, by engaging the adaptor coupling element to the container coupling element, to pierce the pierceable membrane with the piercing member to communicate the associated paint within the paint container with the adaptor bore and thus with the valve body bore; and, wherein the nozzle is moveable with respect to the valve body and an interior passage including the bore of the nozzle and the bore extending through the valve body is selectively opened in response to movement of the nozzle relative to the valve body to cause the associated paint within the associated paint container to flow under the pressure out of the associated paint container, through the adaptor bore, through the valve body bore and through the nozzle bore to ambient.

2. The fluid dispensing apparatus of claim 1 wherein the fluid dispensing apparatus is operable by removing the bottom of the adaptor from the associated paint container to remove the pressure greater than ambient from the associated paint container to permit any associated paint within the associated paint container to be removed at ambient pressure.

3. The fluid dispensing apparatus of claim 1 wherein;

the bottom of the valve body comprises a coupling element formed on an inner cylindrical shaped portion of valve body;

the top of the adaptor comprises a coupling element formed on an outer cylindrical shaped portion of the adaptor; and, the coupling element of the valve body engages with the coupling element on the top of the adaptor to attach the valve body to the adaptor.

4. The fluid dispensing apparatus of claim 1 wherein the valve body further comprises:

a fluid passage, that is not the valve body bore, having a first end that communicates with the valve body bore and a second end that communicates with an area outside the valve body; and, a pressure relief valve positioned at least partially within the fluid passage and operable between a first mode sealing the fluid passage and a second mode permitting the pressure to diminish through the valve body bore, through the fluid passage and to ambient.

5. The fluid dispensing apparatus of claim 1 wherein:

the valve body, adaptor and nozzle comprise a kit.

6. The fluid dispensing apparatus of claim 1 wherein:

the piercing member is positioned at least partially within the adaptor bore and does not extend below the bottom of the adaptor.

7. The fluid dispensing apparatus of claim 1 wherein:

the adaptor comprises a shoulder positioned between the adaptor top and the adaptor bottom and having a surface that acts as a stop that contacts the surface of the valve body when the adaptor and valve body are attached together.

8. The fluid dispensing apparatus of claim 1 wherein:

the adaptor comprises a seal that prevents fluid flow except through the adaptor bore.

9. The fluid dispensing apparatus of claim 3 wherein:

the bottom valve body coupling element comprises a threaded section;

the top adaptor coupling element comprises a threaded section; and, the threaded section of the valve body coupling element engages the threaded section of the adaptor coupling element to attach the bottom of the valve body to the top of the adaptor.

10. A method of dispensing a paint fluid from an associated paint container under a pressure greater than ambient, the associated paint container containing associated paint and having a pierceable membrane and a coupling element on a surface of the associated paint container, the method comprising the steps of:

(A) providing a fluid dispensing apparatus comprising: (1) a valve body having a top, a bottom and a bore that extends through the valve body; (2) an adaptor having a top attached to the bottom of the valve body, a bottom, a bore that extends through the adaptor, a coupling element on a bottom surface of the adaptor and a piercing member; wherein the adaptor bore communicates with the valve body bore; and, (3) a nozzle attached to the top of the valve body and having a bore that is communicatable with the valve body bore;

(B) attaching the bottom of the adaptor to the associated paint container by engaging the adaptor coupling element to the container coupling element to pierce the pierceable membrane with the piercing member to communicate the associated paint within the paint container with the adaptor bore and thus with the valve body bore; and, (C) moving the nozzle with respect to the valve body to open an interior passage comprising the bore extending through the valve body and the bore extending through the adaptor and cause the associated paint within the associated paint container to flow under the pressure out of the associated paint container, through the adaptor bore, through the valve body bore and through the nozzle bore to ambient.

11. The method of claim 10 further comprising the step of:

removing the bottom of the adaptor from the associated paint container by disengaging the adaptor coupling element from the container coupling element to remove the pressure greater than ambient from the associated paint container to permit any associated paint within the associated paint container to be removed at ambient pressure.

12. The method of claim 10 wherein:

step (A) comprises the step of: providing the valve body with: (1) a fluid passage, that is not the valve body bore, having a first end that communicates with the valve body bore and a second end that communicates with an area outside the valve body; and, (2) a pressure relief valve positioned at least partially within the fluid passage; and, wherein the pressure relief valve is operable between a first mode sealing the fluid passage and a second mode permitting the pressure to diminish through the valve body bore, through the fluid passage and to ambient.

13. The method of claim 10 wherein:

step (A) comprises the step of: providing the adaptor with a seal that prevents fluid flow except through the adaptor bore; and, step (B) comprises the step of: compressing the seal.

14. A paint apparatus comprising:

(A) a paint container containing a paint fluid under a pressure greater than ambient and having a pierceable membrane;

(B) a fluid dispensing apparatus comprising: (1) a valve body having a top, a bottom and a bore that extends through the valve body; (2) an adaptor having a top, a bottom, a bore that extends through the adaptor and a piercing member, wherein the bottom of the valve body is attached to the top of the adaptor and the adaptor bore communicates with the valve body bore; (3) a nozzle attached to the top of the valve body and having a bore that is communicatable with the valve body bore;

(C) wherein the fluid dispensing apparatus is operable by attaching the bottom of the adaptor to the paint container to pierce the pierce able membrane with the piercing member to communicate the paint within the paint container with the adaptor bore and thus with the valve body bore;

(D) wherein the nozzle is operable to permit the paint within the paint container to flow under the pressure out of the paint container, through the adaptor bore, through the valve body bore and through the nozzle bore to ambient; and, (E) further comprising at least one of:

(1) a dispensing wand comprising: (a) a receiving portion that receives the paint container; (b) a trigger; (c) a nozzle lever; (d) wherein the paint container is positioned within the receiving portion; and, (e) wherein operating the trigger causes the nozzle lever to contact the nozzle to operate the nozzle; and, (2) a spray apparatus comprising; (a) a housing; (b) a hollow barrel supported to the housing; (c) a container receiving portion that receives the paint container; (d) a trigger; and, (e) wherein moving the trigger with respect to the housing deflects the nozzle to operate the nozzle to permit the paint within the paint container to flow under the pressure out of the paint container and through the hollow barrel.

15. The paint apparatus of claim 14 wherein the fluid dispensing apparatus is operable by removing the bottom of the adaptor from the paint container to remove the pressure greater than ambient from the paint container to permit any paint within the associated paint container to be removed at ambient pressure.

16. The paint apparatus of claim 14 comprising a dispensing wand comprising:

a receiving portion that receives the paint container;

a trigger;

a nozzle lever;

wherein when the paint container is positioned within the receiving portion; and, wherein operating the trigger causes the nozzle lever to contact the nozzle to operate the nozzle.

17. The paint apparatus of claim 16 wherein the dispensing wand further comprises:

a grip for holding the dispensing wand by a user; and, a wheel, wherein the wheel is rotationally attached to the wand and is rotatable on a surface with respect to the wand to move the dispensing wand with respect to the surface being painted.

18. The paint apparatus of claim 14 comprising a spray apparatus comprising:

a housing;

a hollow barrel supported to the housing;

a container receiving portion that receives the paint container;

a trigger; and, wherein moving the trigger with respect to the housing deflects the nozzle to operate the nozzle to permit the paint within the paint container to flow under the pressure out of the paint container and through the hollow barrel.

19. The paint apparatus of claim 14 wherein the valve body further comprises:

a fluid passage having a first end that communicates with the valve body bore and a second end that communicates with an area outside the valve body; and, a pressure relief valve positioned at least partially within the fluid passage and operable between a first mode sealing the fluid passage and a second mode permitting the pressure to diminish through the valve body bore, through the fluid passage and to ambient.

20. The paint apparatus of claim 14 wherein the nozzle is movable with respect to the valve body to permit the paint within the paint container to flow under the pressure out of the paint container, through the adaptor bore, through the valve body bore and through the nozzle bore to ambient.

* * * * *